United States Patent
Yamano et al.

(10) Patent No.: US 10,466,536 B2
(45) Date of Patent: Nov. 5, 2019

(54) BACKLIGHT DEVICE AND LIQUID CRYSTAL DISPLAY APPARATUS

(71) Applicant: PANASONIC INTELLECTUAL PROPERTY MANAGEMENT CO., LTD., Osaka (JP)

(72) Inventors: Yoshikazu Yamano, Osaka (JP); Hisanori Sasaki, Osaka (JP); Yasuhiro Kumamoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/962,828

(22) Filed: Apr. 25, 2018

(65) Prior Publication Data

US 2018/0239197 A1 Aug. 23, 2018

Related U.S. Application Data

(63) Continuation of application No. PCT/JP2016/003846, filed on Aug. 24, 2016.

(30) Foreign Application Priority Data

Dec. 25, 2015 (JP) .................................. 2015-255447

(51) Int. Cl.
*G02F 1/1335* (2006.01)
*G02F 1/1333* (2006.01)

(52) U.S. Cl.
CPC .. *G02F 1/133611* (2013.01); *G02F 1/133605* (2013.01); *G02F 1/133606* (2013.01);
(Continued)

(58) Field of Classification Search
CPC ............... G02F 1/1333; G02F 1/1335; G02F 1/133553; G02F 1/1336; G02F 1/133602;
(Continued)

(56) References Cited

U.S. PATENT DOCUMENTS

| 2010/0141867 A1 | 6/2010 | Ogihara et al. |
| 2012/0268688 A1 | 10/2012 | Sato et al. |
| 2015/0293405 A1 | 10/2015 | Park et al. |

FOREIGN PATENT DOCUMENTS

| EP | 3 273 297 A1 | 1/2018 |
| JP | 2011-151002 A | 8/2011 |

OTHER PUBLICATIONS

Extended European Search Report dated Oct. 31, 2018 issued in corresponding European patent application No. 16877918.9.
(Continued)

*Primary Examiner* — Thoi V Duong
(74) *Attorney, Agent, or Firm* — McDermott Will & Emery LLP

(57) ABSTRACT

A backlight device includes: a reflection sheet having a reflection surface which is divided into a plurality of reflection regions by a plurality of partitions that are each a ridge-shaped projection; light sources disposed in the respective reflection regions; a luminance uniformizing plat that transmits light incident from a first surface opposed to the reflection surface, and emits the light from the second surface; and a diffusion plate that diffuses and emits the light emitted from the second surface. The luminance uniformizing plate includes a high light-transmittance region between a region opposed to each of the light sources and a region opposed to a vertex portion of a corresponding one of the plurality of partitions, the high light-transmittance region being higher in light-transmittance per unit area than the region opposed to the light source and the region opposed to the vertex portion.

7 Claims, 5 Drawing Sheets

(52) U.S. Cl.
CPC ............... *G02F 1/133608* (2013.01); *G02F 2001/133601* (2013.01)

(58) Field of Classification Search
CPC ......... G02F 1/133606; G02F 1/133605; G02F 1/133611; G02F 1/133603; G02F 1/133615; G02F 1/133608; G02F 1/133504; G02F 1/133; G02F 1/133308; G02F 2001/133607; G02F 2001/133507; G02F 2001/133601; G02F 2201/34; G02F 2203/03; G02B 6/0055; G02B 6/0073; G02B 6/0053; G02B 6/0051; G02B 5/045; G02B 5/0231; G02B 5/0247; G02B 5/0284; G02B 5/124; G02B 5/0252
See application file for complete search history.

(56) References Cited

OTHER PUBLICATIONS

International Search Report and Written Opinion dated Nov. 15, 2016, issued in International Patent Application No. PCT/JP2016/003846, with partial English translation.

BACKLIGHT DEVICE AND LIQUID CRYSTAL DISPLAY APPARATUS

CROSS REFERENCE TO RELATED APPLICATIONS

This application is a U.S. continuation application of PCT International Patent Application Number PCT/JP2016/003846 filed on Aug. 24, 2016, claiming the benefit of priority of Japanese Patent Application Number 2015-255447 filed on Dec. 25, 2015, the entire contents of which are hereby incorporated by reference.

BACKGROUND

1. Technical Field

The present disclosure relates to a backlight device including a plurality of light sources and a liquid crystal display apparatus equipped with the backlight device.

2. Description of the Related Art

The liquid crystal display apparatus has features such as thin-screen, low power consumption, and high definition, and is prevailing in the field of television receivers along with increase in the screen size due to development of manufacturing technology. However, it has been pointed out that the liquid crystal display has a low contrast (dynamic range) of displayed images due to a display method. For this reason, in recent years, technology related to improvement in the quality of displayed images is further along in development.

A liquid crystal display apparatus used for television receivers is equipped with a backlight device that illuminates the entire display surface from the rear side. A plurality of granular light-emitting diodes (light-emitting diode, hereinafter denoted by an LED) arranged on the back side of a liquid crystal panel are used as light sources of the backlight device. In order to obtain a uniform luminance over the entire region illuminated by the plurality of light sources, a light reflection sheet is provided on the side opposite to the side in which the liquid crystal panel is installed, or a light diffusion plate is provided between the liquid crystal panel and the light sources. Also, as is disclosed in Japanese Unexamined Patent Application Publication No. 2011-151002, the reflection sheet is divided into a plurality of reflection regions by providing a lattice-shaped partition on the reflection sheet, the reflection regions are provided with the above-mentioned respective light sources, and luminance control reflection region by reflection region (also called area control or local dimming) is made possible while the interference from the light sources between the reflection regions is being reduced by the partition (see PTL 1). Consequently, for instance, when a scene, which is divided into a bright portion and a dark portion in the screen, is displayed, the luminance is controlled on a per reflection region basis according to the brightness of each portion so that the contrast between the portions is increased.

In a conventional liquid crystal display apparatus, mitigation of the effect by the partition on the uniformity of luminance in each of the reflection regions is insufficient, and thus undesirable variation in the luminance occurs in each of the reflection regions. As a result, a problem arises in that the contrast between a bright portion and a dark portion in the screen cannot be sufficiently increased in the entire backlight device.

SUMMARY

The present disclosure provides a liquid crystal display apparatus capable of further reducing such a variation in the luminance, and displaying a higher contrast on the entire screen.

A backlight device according to the present disclosure includes: a reflection sheet having a reflection surface which is divided into reflection regions by a plurality of partitions that are each a ridge-shaped projection; light sources disposed in the respective reflection regions of the reflection surface; a luminance uniformizing plate that transmits light emitted by the light sources, by receiving the light with a first surface of the luminance uniformizing plate and light reflected off from the reflection sheet and emitting the received light from a second surface of the luminance uniformizing plate, the first surface being located opposite the reflection surface, the second surface being located on a reverse side of the first surface; and a diffusion plate that diffuses and emits the light emitted from the second surface. The luminance uniformizing plate includes a high light-transmittance region between a region opposed to each of the light sources and a region opposed to a vertex portion of a corresponding one of the plurality of partitions, the high light-transmittance region being higher in light-transmittance per unit area than the region opposed to the light source and the region opposed to the vertex portion.

In addition, the liquid crystal display apparatus according to the present disclosure includes a liquid crystal panel; and the above-described backlight device which is disposed on a back side of the liquid crystal panel and has a size corresponding to the liquid crystal panel.

The backlight device according to the present disclosure reduces the variation in the luminance of emission light, and is effective for implementing a liquid crystal display apparatus capable of higher contrast presentation throughout the screen.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Hereinafter, an embodiment will be described in detail with reference to the drawings as appropriate. However, a detailed description more than necessary may be omitted.

For instance, a detailed description of already well-known matters and a redundant description of substantially the same components may be omitted. This is for the purpose of avoiding unnecessarily redundant description in the following and facilitating the understanding of those skilled in the art.

It should be noted that the accompanying drawings and the following description are provided to allow those skilled in the art to understand the present disclosure sufficiently, and these are not intended to limit the subject matter recited in the claims.

Embodiment

Hereinafter, an embodiment will be described using FIGS. 1 to 5D.

Figure 1:
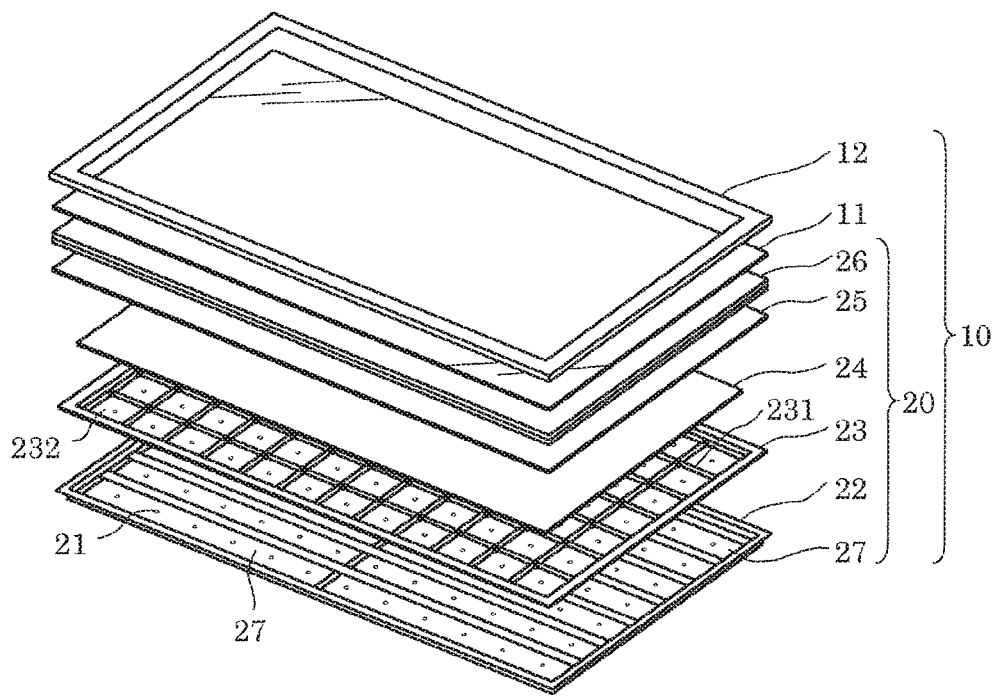
FIG. 1 is an exploded perspective view illustrating a schematic configuration of an entire liquid crystal display apparatus in an embodiment.

FIG. 1 is an exploded perspective view illustrating a schematic configuration of an entire liquid crystal display apparatus in an embodiment.

[1-1. Configuration]

[1-1-1. Configuration of Liquid Crystal Display Apparatus]

As illustrated in FIG. 1, liquid crystal display apparatus 10 includes liquid crystal panel 11, bezel 12, and backlight device 20 which is disposed on the back side of liquid crystal panel 11 and is in a rectangular shape having a size corresponding to liquid crystal panel 11.

Liquid crystal panel 11 is a transmissive liquid crystal panel having a rectangular flat shape, and displays an image by transmitting or blocking the light emitted from backlight device 20 located in the back of liquid crystal panel 11.

Bezel 12 is a casing of the front surface of liquid crystal display apparatus 10, and surrounds liquid crystal panel 11 to protect the peripheral edge portion thereof. From the viewpoint of design and light weight of the product, a plastic resin is mainly used as a material of bezel 12.

[1-1-2. Configuration of Backlight Device]

Backlight device 20 includes a plurality of printed substrates 27 in which a plurality of light sources 21 are installed, chassis 22 that stores the plurality of printed substrates 27, and optical unit 26, diffusion plate 25, luminance uniformizing plate 24, and reflection sheet 23 which are disposed between liquid crystal panel 11 and light sources 21.

Printed substrates 27 receive supply of power from a power supply which is not illustrated, and supplies the power to light sources 21 as the drive power. Printed substrates 27 in the present disclosure have a substantially rectangular shape, and 6 light sources 21 are mounted in a row in a longitudinal direction. According to FIG. 1, the plurality of printed substrates 27 are arranged in 7 rows×2 columns in chassis 22. As a result of this arrangement of printed substrates 27, the plurality of light sources 21 are disposed in a matrix form. It is to be noted that the shape, size, number, and arrangement of printed substrates 27, and the number of light sources 21 mounted in each printed substrate 27 are not the gist of the present disclosure, and not intended to limit the present invention.

The plurality of light sources 21 may be each formed using multiple types of light sources each of which emits monochromatic light such as red light, blue light, and green light, or formed using only one light source which emits white light. For instance, an LED is used as such light source 21.

Chassis 22 is also a casing of the back surface of liquid crystal display apparatus 10. Chassis 22 is composed of a component using a material, for instance, plastic, metal with a highly radioactive ceramic sheet attached to the front and back, anodized metal in black or the like, or carbon-black-coated metal. An alloy with a main component, such as aluminum or iron is used as the metal, for instance.

Reflection sheet 23 is a component composed of a substantially flat plate-shaped resin, and the major surface is, for instance, a white specular surface and reflection sheet 23 efficiently reflects incident light on the major surface. Hereinafter the major surface is also referred to as the reflection surface. The reflection surface is divided into a plurality of reflection regions 232 arranged in a matrix form by a plurality of ridge-shaped partitions 231 arranged in a lattice pattern. The term ridge-shaped herein is used to mean a shape of partitions 231 having a cross section, which is perpendicular to the extension direction of partitions 231, tapering toward the vertex portion (in the direction opposite to the direction in which chassis 22 is present) such as substantially triangular or substantially trapezoidal.

Figure 2:
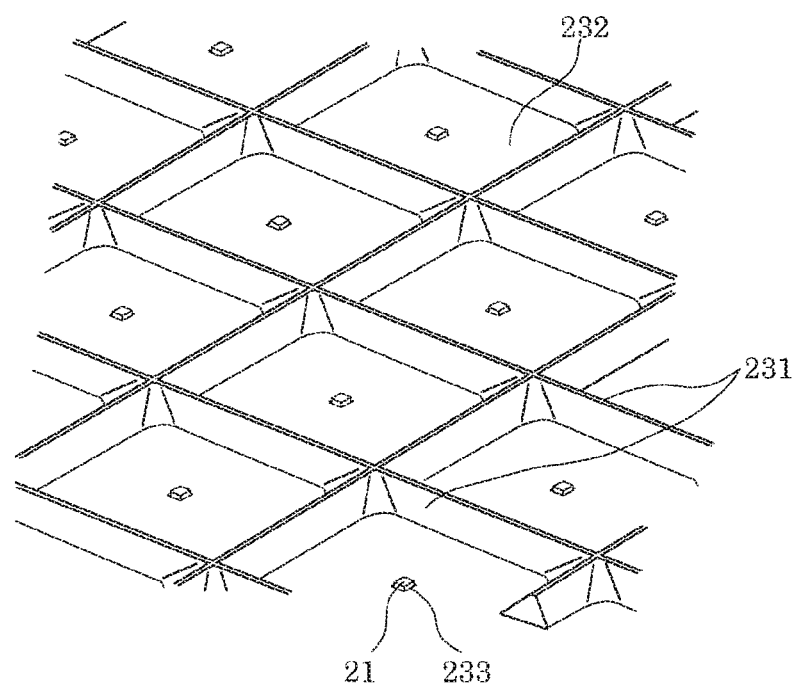
FIG. 2 is a partially enlarged view of a reflection sheet in the embodiment.

The vertical and horizontal pitches of reflection regions 232 are in common with the vertical and horizontal pitches of light sources 21 on chassis 22. For instance, when each of the vertical and horizontal pitches of reflection regions 232 is 50 mm, light sources 21 are arranged with 50 mm intervals. Also, each of reflection regions 232 includes opening 233 at substantially the center. FIG. 2 is a partially enlarged view of a state where reflection sheet 23 is stacked on chassis 22 in this embodiment. Opening 233 is provided so that light sources 21 are exposed to the surface of reflection sheet 23 in this state. Therefore, in liquid crystal display apparatus 10 in an assembled state, light sources 21 are disposed in respective reflection regions 232. Reflection sheet 23 reflects the light emitted from light sources 21 toward luminance uniformizing plate 24. Such reflection sheet 23 is produced by providing projections and depressions in, for instance, a resin flat plate by vacuum molding. For instance, ridge-shaped partitions 231 are provided so that the height is 4.5 mm and the pitch is 50 mm. Also, processing such as drilling is performed as necessary.

Luminance uniform plate 24 is a plate-shaped component made of a highly reflective resin material having translucency (for instance, polyethylene terephthalate). Luminance uniformizing plate 24 is disposed so that one of major surfaces (hereinafter also referred to as a first surface) of luminance uniformizing plate 24 is opposed to the reflection surface of reflection sheet 23 with a distance in liquid crystal display apparatus 10 in an assembled state, and luminance uniformizing plate 24 receives the emission light from light sources 21 and the reflection light from reflection sheet 23 by the first surface. Luminance uniform plate 24 transmits these emission light and reflection light, and emits light with enhanced uniformity of luminance from a second surface which is the major surface on the opposite side of the first surface. The configuration of luminance uniformizing plate 24 for emitting light with enhanced uniformity of luminance will be described later. Such luminance uniformizing plate 24 is produced by molding the above-mentioned resin as the material by, for instance, press working.

Diffusion plate 25 is a plate-shaped component having a refractive index higher than air, and is formed with materials including, for instance, mainly acrylic resins such as polymethylmethacrylate, or polycarbonate, and further including fine particles distributed over the entirety. In liquid crystal display apparatus 10 in an assembled state, diffusion plate 25 is located on the second surface side of luminance uniformizing plate 24, diffuses the incident light from one of the major surfaces, opposed to the second surface of luminance uniformizing plate 24 by the particles, and emits the light from the major surface on the opposite side of the one major surface. Such diffusion plate 25 can be produced, for instance, by injection molding the above-mentioned materials.

Optical unit 26 is located between liquid crystal panel 11 and diffusion plate 25 in liquid crystal display apparatus 10 in an assembled state, and has a major surface opposed to the surface of diffusion plate 25, from which light is emitted. Optical unit 26 has a size corresponding to liquid crystal panel 11, and includes an optical sheet laminate for further diffusing and focusing the emission light from diffusion plate 25. The optical sheet laminate includes, for instance, a prism sheet that focuses the incident light from diffusion plate 25 in a direction in which liquid crystal panel 11 is present, a diffusion sheet that further diffuses the incident light from diffusion plate 25, and a polarization sheet that transmits light which is of the incident light from diffusion plate 25 and is in a specific polarization plane corresponding to a polarization axis of liquid crystal panel 11. The luminance of the light emitted from optical unit 26 is more uniformized than in the light incident, and the uniformity of the luminance of backlight device 20 serving as a surface light source of liquid crystal display apparatus 10 is further increased.

In backlight device 20 implemented by assembling these components, the incident light from light sources 21 on the first surface of luminance uniformizing plate 24 can be classified into the following three types with different paths. One type is the direct light from light source 21. Another type is the reflection light which is reflected only once by reflection sheet 23 since emission from light sources 21 and enters the first surface. Still another type is the reflection light which is reflected m times by reflection sheet 23, n times by luminance uniformizing plate 24, and enters the first surface (m is an integer greater than or equal to 1, n is an integer greater than or equal to 1, and the sum of m and n is an integer greater than or equal to 2). The incident light consisting of these three types of light on luminance uniformizing plate 24 is combined in the regions opposed to reflection regions 232, and after the uniformity of luminance is increased by the luminance uniformizing plate, the light is emitted to liquid crystal panel 11. Hereinafter, among these components, the components for increasing the uniformity of luminance by luminance uniformizing plate 24 will be described.

[1-1-3. Configuration of Luminance Uniformizing Plate]

Hereinafter the configuration of luminance uniformizing plate 24 for transmitting the incident light on the first surface to emit light from the second surface with enhanced uniformity of luminance will be described using an example. However, before that, variation in the intensity of the incident light on luminance uniformizing plate 24 before increase of the uniformity will be described in detail.

Figure 3:
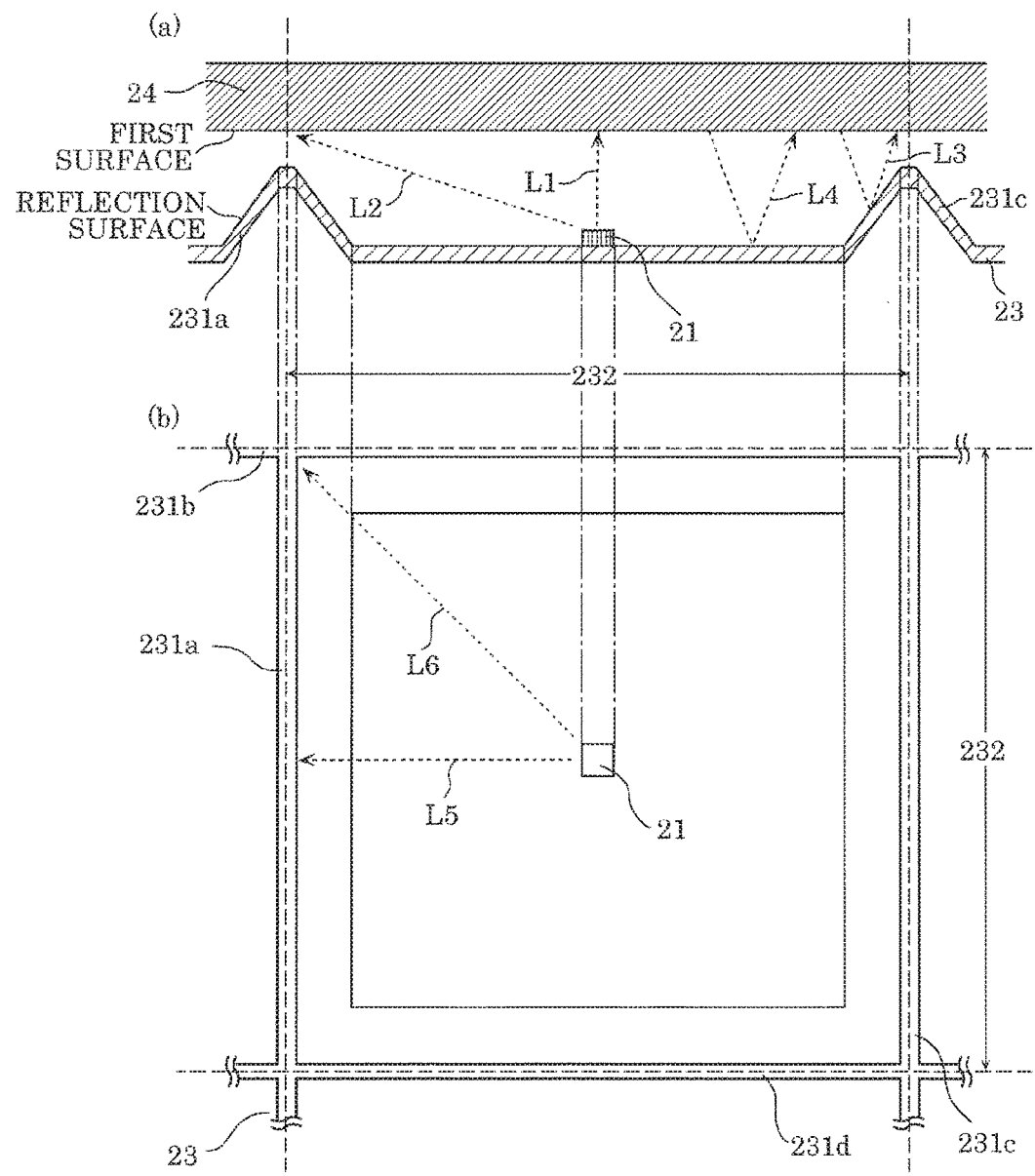
FIG. 3 is a schematic view illustrating a positional relationship between a light source, a plurality of partitions, and a luminance uniformizing plate in the embodiment.

FIG. 3 is a schematic view illustrating a positional relationship between light source 21 on one reflection region 232, a plurality of partitions 231, and luminance uniformizing plate 24 in backlight device 20 in this embodiment. (a) of FIG. 3 is a cross sectional view of reflection sheet 23 and luminance uniformizing plate 24, and (b) of FIG. 3 is a plan view of reflection sheet 23 as seen from the side of luminance uniformizing plate 24. The dashed line indicates the boundary of reflection region 232 surrounded by four partitions 231 (here, in order to distinguish the four partitions and show a correspondence between (a) and (b), reference symbols of 231a to 231d are given to the respective partitions), and the boundary of a region, opposed to reflection region 232, of luminance uniformizing plate 24. Dotted line arrows L1 to L6 each indicate an example of a path of light to the first surface. It is to be noted that although the contour of the cross section of partitions 231 in FIG. 3 is formed of straight lines, the partitions 231 may be shaped to have a cross section with a contour formed of straight lines, curves, or both of these. Also, although partitions 231 are each drawn as a mountain fold portion of reflection sheet 23, the structure of partitions 231 is not limited to the illustrated structure as far as each partition 231 is a ridge-shaped projection on the side of reflection surface of reflection sheet 23.

The incident light on luminance uniformizing plate 24 attenuates according to a travel distance after emission from light source 21, or more specifically, attenuates in inverse proportion to the square of a travel distance. For instance, the direct light, which is incident light of one of the above-mentioned three types, attenuates according to the distance of a path from the emission from light source 21 until the direct light reaches the first surface of luminance uniformizing plate 24. The lengths of arrow L1 and arrow L2 in (a) of FIG. 3 and arrows L5 and L6 in (b) of FIG. 3 each indicate a travel distance of the direct light from light source 21, and the incident light attenuates in correlation with the travel distance. More specifically, the incident light on luminance uniformizing plate 24 traveled farther from light source 21 is weaker. Also, in backlight device 20 in this embodiment, reflection sheet 23 has partitions 231 that project toward luminance uniformizing plate 24, and thus the distance between the reflection surface and the first surface varies with location (for instance, arrows L3 and L4). Therefore, similarly to the direct light, the degree of attenuation of the reflection light also varies depending on where the reflection light is incident. It is to be noted that the intensity of the reflection light incident on luminance uniformizing plate 24 correlates with not only the above-mentioned travel distance, but also the number of times the reflection light is reflected off from reflection sheet 23 and luminance uniformizing plate 24 before incidence. More accurately, in addition to the travel distance, the reflection light attenuates in correlation with the m-th power of the reflectivity of reflection sheet 23 and the n-th power of the reflectivity of luminance uniformizing plate 24 (m and n are as mentioned above).

Like this, the light emitted from light source 21 has several factors for attenuation before the light enters luminance uniformizing plate 24, and the degree of attenuation is different by location in the region, opposed to each reflection region 232, of luminance uniformizing plate 24. Although the above-described comparison is made between the region opposed to partitions 231 and the other region (arrows L3 and L4), the degree of attenuation of the reflection light is different even within the region opposed to partitions 231 because of difference in the distance from the reflection surface. For instance, the reflection light which is reflected by the highest portion of partition 231 (hereinafter referred to as a vertex portion of partition 231) and enters the region opposed to the portion, has the smallest attenuation due to the travel distance.

The intensity of such incident light consisting of the direct light and the reflection light in the entire region of luminance uniformizing plate 24 opposed to one reflection region 232 has a distribution such that the intensity is the highest, for instance, in the region opposed to light source 21, attenuates more with distance from light source 21, and in the region opposed to partitions 231, the intensity increases with distance from light source 21, in other words, as the distance to the vertex portion becomes shorter. However, in such a distribution, the incident light on the region of luminance uniformizing plate 24, opposed to the vertex portions of partitions 231, is weaker than the incident light on the region opposed to light source 21.

It is to be noted that the positional relationship between light source 21, the plurality of partitions 231, and luminance uniformizing plate 24 illustrated in FIG. 3 is in common with the plurality of reflection regions 232 and the regions of luminance uniformizing plate 24 opposed to these regions. Therefore, the above-described distribution of intensity of incident light is commonly observed in the region of luminance uniformizing plate 24, opposed to any of reflection regions 232.

In the present disclosure, luminance uniformizing plate 24 is configured to have transmittance to the incident light (hereinafter simply referred to as light transmittance) varying in a predetermined pattern in each of the regions opposed to different reflection regions 232, and thus the uniformity of luminance of the light emitted from the second surface in the region is increased. Specifically, the predetermined pattern is such that in the regions, opposed to reflection regions 232, of luminance uniformizing plate 24, the distribution of light transmittance of luminance uniformizing plate 24 has a negative correlation with the intensity distribution of the incident light on luminance uniformizing plate 24. The product of the intensity of incident light by the light transmittance at each location is thereby made closer to a constant, and thus the uniformity of the luminance of emission light from luminance uniformizing plate 24 is increased. As a result, the contrast between a bright portion and a dark portion in a screen according to an image displayed on the entire screen is increased. Hereinafter, the configuration of luminance uniformizing plate 24 that achieves the predetermined pattern will be described by way of example when the intensity of the incident light on luminance uniformizing plate 24 shows the above-described distribution.

Figure 4:
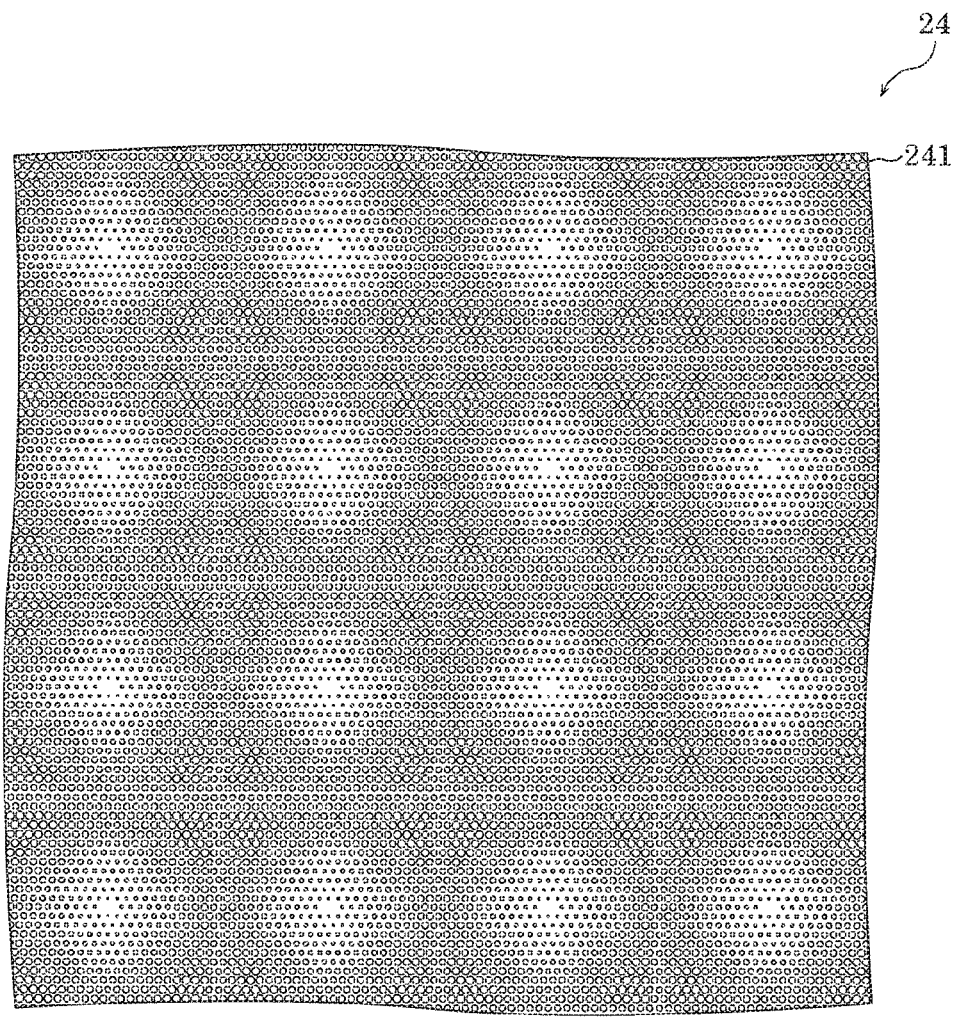
FIG. 4 is a plan view of an example of the luminance uniformizing plate in the embodiment.

FIG. 4 is a plan view of an example of luminance uniformizing plate 24 (partial) in this embodiment. A great number of circles seen in FIG. 4 indicate through holes 241 that penetrate through between the first surface and the second surface of luminance uniformizing plate 24. In other words, luminance uniformizing plate 24 illustrated in FIG. 4 has a plurality of through holes 241 that penetrate through luminance uniformizing plate 24 between the first surface and the second surface. Through holes 241 in this example have a variation in size (the opening area of each through hole). These through holes 241 in different sizes are arranged to form one pattern in the entire region, opposed to one reflection region 232, of luminance uniformizing plate 24, and the pattern is repeated vertically and horizontally over entire luminance uniformizing plate 24. It is to be noted that the plurality of through holes 241 arranged in such a pattern are formed using a mold including a plurality of projections which penetrate a flat plate of a resin material, for instance, in one process in the press working for producing luminance uniformizing plate 24 described above.

The predetermined pattern of the light transmittance is achieved by the pattern (hereinafter referred to as a unit pattern) over the entire region opposed to one reflection region 232. Hereinafter, the unit pattern will be described.

Figure 5:
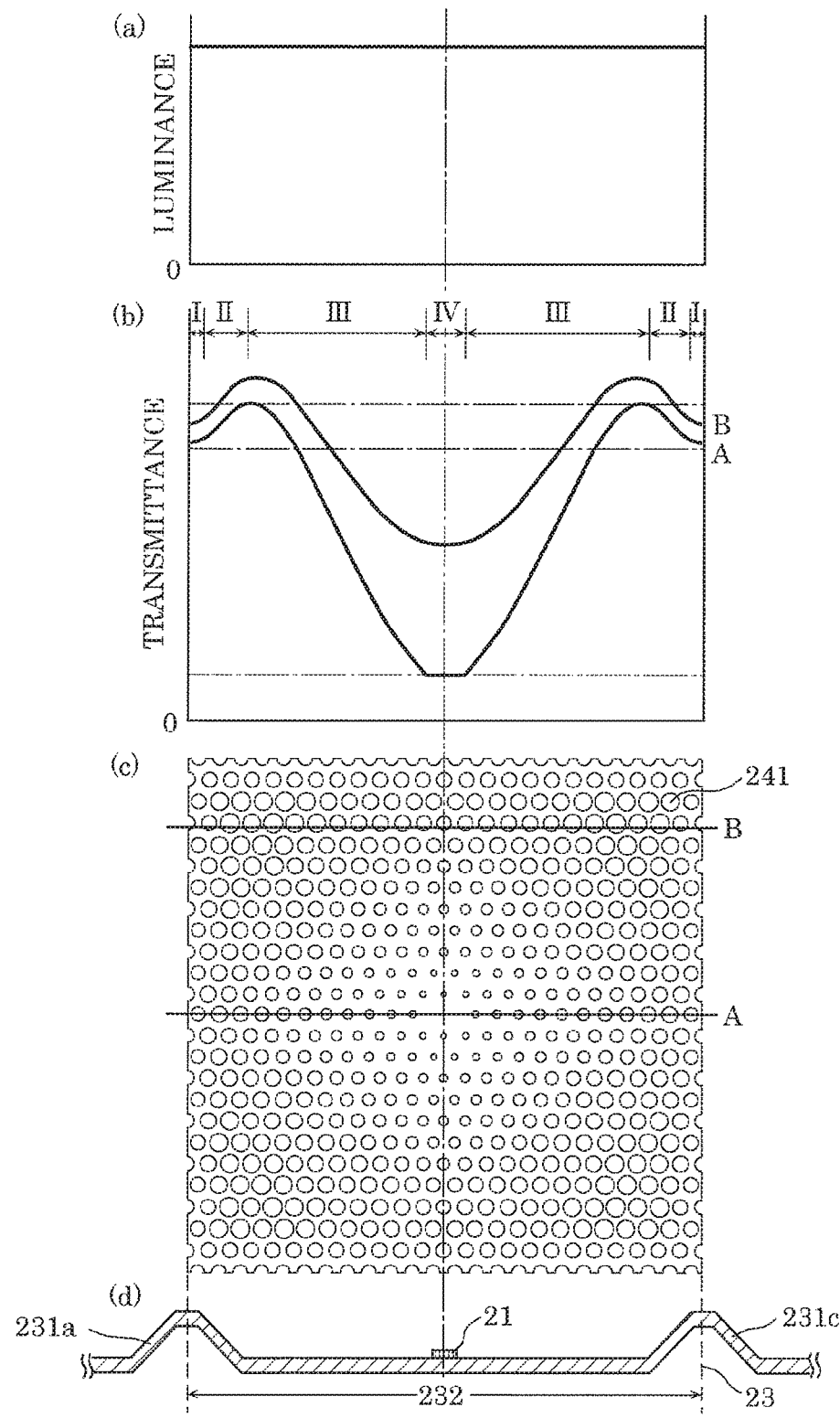
FIG. 5 is a diagram illustrating an example of a unit pattern and a light transmittance in the unit pattern of the luminance uniformizing plate in the embodiment.

FIG. 5 is a diagram illustrating an example of a unit pattern and the light transmittance of luminance uniformizing plate 24 in the unit pattern in this embodiment. The unit pattern is illustrated in (c) of FIG. 5, and the graph in (b) of FIG. 5 indicates the light transmittance on line A and line B across luminance uniformizing plate 24 having the unit pattern in (c) of FIG. 5. (d) of FIG. 5 is a cross sectional view illustrating a cut plane obtained by cutting reflection sheet 23 by a plane containing line A in (c) of FIG. 5. It is to be noted that the cross sectional view is basically common with the cross sectional view illustrated in (a) of FIG. 3, and in FIG. 5, two partitions 231, between which the reflection region is interposed, are labeled with respective reference symbols in common with FIG. 3. (a) is a graph illustrating the intensity of emission light emitted by luminance uniformizing plate 24 having the light transmittance illustrated in (b) and receiving the incident light in the above-described intensity distribution. It is to be noted that the horizontal axes of the graphs in (a) and (b) each correspond to the position in the crosswise direction of the unit pattern illustrated in (c) and the position in the crosswise direction of reflection sheet 23 illustrated in (d).

Here, the light transmittance used for description of the unit pattern refers to light transmittance per unit area. Specifically, the light transmittance illustrated by the graph is the ratio of the total of the light passed through hole 241 and emitted through an opening on the side of the second surface, and the light passed through the resin and appeared on the side of the second surface with respect to the incident light on the first surface in a region having a unit area. It is to be noted that the region having a unit area in the present disclosure does not fit inside an opening of any one of through holes 241.

First, referring to (b) and (c) of FIG. 5, the relationship between the configuration of luminance uniformizing plate 24 having the unit pattern and the light transmittance will be described.

As described above, the material itself of luminance uniformizing plate 24 has translucency but is not transparent. More specifically, luminance uniformizing plate 24 is a white resinous plate-shaped body having through holes 241. Therefore, luminance uniformizing plate 24 transmits light to a certain extent in any region even not including through hole 241. For instance, in the curve corresponding to line A, a range where the light transmittance is constant near the center of the curve, corresponds to a region near the center of the unit pattern in (c) where no through hole 241 is present. The reason why the light transmittance is not zero even in this range is due to the translucency of the material itself of luminance uniformizing plate 24. In contrast, through holes 241 transmits light from the first surface to the second surface at a rate (substantially 100%) higher than the rate of the resin which is the material of luminance uniformizing plate 24. Therefore, in the region of the unit area, the greater the opening area of through holes 241 is, the higher the light transmittance of the region is. In other expressions, the opening area of through holes 241 per unit area of luminance uniformizing plate 24 and the light transmittance have a positive correlation with each other. The variation in the light transmittance in the region, opposed to one reflection area 232, of luminance uniformizing plate 24 is achieved by varying the opening area per unit area (hereinafter referred to as the opening ratio) with location. In short, the light transmittance is enhanced by increasing the opening ratio, and the light transmittance is reduced by decreasing the opening ratio. In the unit pattern illustrated in (c) of FIG. 5, through holes 241 are arranged with even intervals to the extent that through holes 241 are present, and the opening ratio is varied by changing the size of through holes 241, and thus the variation in the light transmittance is achieved.

Next, the variation in the light transmittance of luminance uniformizing plate 24 in the unit pattern thus achieved will be described in detail with reference to (a) to (d) of FIG. 5.

In this embodiment, as described above, the intensity of incident light in the region, opposed to one reflection region 232, of luminance uniformizing plate 24 is highest in the region opposed to light source 21, attenuates with distance from light source 21, and in the region opposed to partitions 231, the intensity increases as the distance to the vertex portion becomes shorter. In other words, in the region, not opposed to partitions 231, of luminance uniformizing plate 24, the intensity of incident light and the distance from light source 21 have a negative correlation with each other. In backlight device 20 in this embodiment, a positive correlation between the distance from light source 21 and the light transmittance of luminance uniformizing plate 24 is given such that the product of the intensity of incident light by the light transmittance in the region is made closer to a constant. Consequently, the luminance of the emission light from the second surface of luminance uniformizing plate 24 in the region can be made more uniform regardless of the distance from light source 21 as illustrated in (a) of FIG. 5. In order to achieve the positive correlation, in the region, not opposed to partitions 231, of luminance uniformizing plate 24, through holes 241 are provided in luminance uniformizing plate 24 so that the opening area per unit area of luminance uniformizing plate 24, and the distance from light source 21 have a positive correlation with each other. The region substantially corresponds to the ranges labeled as III and IV in (b) of FIG. 5. It is to be noted that the light transmittance on line A and the light transmittance on line B even at the same crosswise position in (b) of FIG. 5 are differentiated to reflect the difference in the degree of attenuation of light due to a difference in the distance from light source 21.

It is to be noted that even in the region opposed to one reflection region 232, the region opposed to light source 21 and its vicinity may include a region where through hole 241 is not provided as in FIG. 5. The region substantially corresponds to the range labeled as IV in FIG. 5. A region where through hole 241 is not provided like this is determined as appropriate according to, for instance, light distribution of light source 21, and the degree of diffusion of incident light by luminance uniformizing plate 24 (scattering of light in luminance uniformizing plate 24).

In contrast, in the region, opposed to partitions 231, of luminance uniformizing plate 24, the intensity of incident light and the distance from partitions 231 have a negative correlation with each other. In order to emit light with a uniform luminance from the second surface of luminance uniformizing plate 24 in the region, in backlight device 20 in this embodiment, a positive correlation is given such that the product of the intensity of incident light by the light transmittance is made closer to a constant in the region. Consequently, the luminance of the emission light from the second surface of luminance uniformizing plate 24 in the region can be made more uniform regardless of the distance from the vertex portion as illustrated in (a) of FIG. 5. In order to achieve the positive correlation, in the region, opposed to partitions 231, of luminance uniformizing plate 24, through holes 241 are provided in luminance uniformizing plate 24 so that a region is present in which the opening area per unit area of luminance uniformizing plate 24 and the distance from the vertex portion of partition 231 have a positive correlation with each other. The region substantially corresponds to the ranges labeled as I and II in (b) of FIG. 5.

The distribution of the light transmittance of luminance uniformizing plate 24 provided with through holes 241 in this manner will be described by referring to the entire region, opposed to one reflection region 232, of luminance uniformizing plate 24. First, along the boundary between the region opposed to light source 21 and the region opposed to the vertex portion of partition 231, there is a region in which the light transmittance is higher than the light transmittance in either of these regions. More specifically, the region may be described as the vicinity of the boundary of the region, opposed to partitions 231, of luminance uniformizing plate 24, and the region. Referring to (b) of FIG. 5, the region corresponds to a range in the vicinity of a peak of each curve near the boundary between the range labeled as II and the range labeled as III. Also, the light transmittance takes a minimum value in the region opposed to light source 21. The region is included in the range labeled as IV in FIG. 5. On the other hand, a maximum value is observed between the region opposed to light source 21 and the region opposed to the vertex portion of partition 231. In (c) of FIG. 5, through holes 241 having the largest opening area are located in the corners of the region, not opposed to partitions 231, of luminance uniformizing plate 24, (in other words, the light transmittance of luminance uniformizing plate 24 is highest in the corners).

However, the boundary between these regions is not strictly determined based on the relationship between these positions. The boundary between these regions may vary to some extent by the characteristics of scattering of light by the reflection surface of reflection sheet 23 and the diffusion (scattering in luminance uniformizing plate 24) of incident light by luminance uniformizing plate 24. Therefore, in the design of luminance uniformizing plate 24, it is necessary to adjust the distribution of light transmittance as appropriate in consideration of an effect by these variable elements.

[1-1-4. Modification of Configuration of Luminance Uniformizing Plate]

In the example of the unit pattern illustrated in FIG. 5, through holes 241 are arranged with even intervals, and the variation in the opening ratio is achieved by the varied sizes of through holes 241. However, the configuration of luminance uniformizing plate 24 in the invention is not limited to this. Any configuration may be adopted as long as the above-described light transmittance distribution in the unit pattern of luminance uniformizing plate 24 is obtained.

For instance, through holes 241 may each have the same opening area, and the variation in the opening ratio may be achieved by changing the number of through holes 241 per unit area, in other words, the density of through holes 241.

Also, in the example of the unit pattern illustrated in FIG. 5, a positive correlation is observed between the opening area of each through hole 241 in the region not opposed to partitions 231 and the distance from light source 21. However, the correlation is not a requisite of through holes 241 having varied opening areas. In other words, it is sufficient that a positive correlation be established between the distance from light source 21 and the opening ratio, and the opening ratio may be achieved by a plurality of through holes 241 as a whole in a unit area. For instance, in some unit areas, luminance uniformizing plate 24 may be provided with through holes 241 having a larger opening area surrounding one through hole 241 having a smaller opening area. Alternatively, in some unit areas, luminance uniformizing plate 24 may be provided with through holes 241 having a smaller opening area surrounding one through hole 241 having a larger opening area.

In addition, the arrangement of through holes 241 is not limited to the example of the unit pattern illustrated in FIG. 5. For instance, through holes 241 may be arranged along the circumference of a concentric circle with the center at the position immediately above the center of light source 21. Alternatively, through holes 241 may be arranged along the radius of a circle with the center at the position. Alternatively, these arrangements may be applied in combination.

Also, the shape of through holes 241 is not limited to the circular shape as illustrated in FIGS. 4 and 5. Also, the shapes of all through holes 241 are not necessarily congruent or similar. In other words, through holes 241 may have a variety of shapes.

Also, a configuration in which through hole 241 is not included may be adopted to achieve a negative correlation between the light transmittance of luminance uniformizing plate 24 and the intensity of light received by the first surface of luminance uniformizing plate 24. For instance, a light shielding agent such as paint having a light shielding effect may be applied onto luminance uniformizing plate 24 in a predetermined pattern so that the variety in the light transmittance of luminance uniformizing plate 24 may be achieved. The variety in the light transmittance of luminance uniformizing plate 24 may be achieved by applying the light shielding agent with application areas per unit area of luminance uniformizing plate 24 varied by location, for instance. In this case, the variety in the light transmittance is achieved by applying the paint so as to draw dots having different areas or dots at different densities by location, for instance. Alternatively, the concentration of the paint may be changed or paints having different light transmittances may be used depending on location. Alternatively, blind holes may be used instead of through holes 24. In other words, the variety in the light transmittance of luminance uniformizing plate 24 may be achieved by varying the average thickness per unit area of luminance uniformizing plate 24 with location. Any of the above-described configurations in which through holes are not included are also applied so that the light transmittance distribution of luminance uniformizing plate 24 has the same characteristics described above.

Alternatively, through holes 241 and the above-mentioned light shielding agent or blind holes may be used together.

[1-2. Other Modification]

Hereinafter, a modification of the above-described embodiment will be described, the modification accompanying a change of the configuration of luminance uniformizing plate 24 and being related to a change of the components other than luminance uniformizing plate 24.

Figure 6:
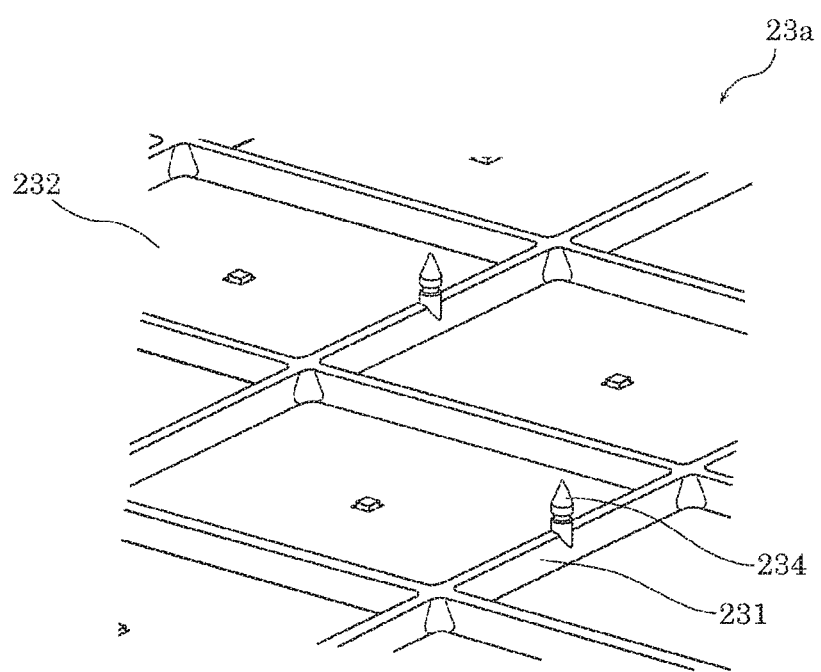
FIG. 6 is a partially enlarged view of a reflection sheet in a modification of the embodiment.

FIG. 6 is a partially enlarged view of reflection sheet 23*a* in a modification of the embodiment.

Reflection sheet 23*a* differs from reflection sheet 23 in that reflection sheet 23*a* further has supporting pillar 234, which projects to luminance uniformizing plate 24, above partitions 231 which project in a direction in which luminance uniformizing plate 24 is present.

Supporting pillar 234 supports luminance uniformizing plate 24 in a state where the tip of supporting pillar 234 is inserted in a hole in luminance uniformizing plate 24. Thus, luminance uniformizing plate 24 is prevented from bending under its own weight. For instance, in liquid crystal display apparatus 10 having a larger display surface, a larger luminance uniformizing plate 24 is used to match the size of the display area. However, a larger size of luminance uniformizing plate 24 is more likely to cause bending under its own weight. When the thickness of luminance uniformizing plate 24 is increased to prevent such bending, reduction in the light transmittance due to the increase in the thickness may cause unfavorable effects such as insufficient luminance of the emission light to the diffusion plate or necessity for change in the specifications of luminance uniformizing plate 24 or other components to avoid such insufficiency of luminance. It is thus not preferable to increase the thickness of luminance uniformizing plate 24 to prevent bending thereof. Even when liquid crystal display apparatus 10 is relatively small, luminance uniformizing plate 24 is likely to bend because of the plurality of through holes 241 as in the present disclosure. When luminance uniformizing plate 24 bends, an appropriate positional relationship as described above between light source 21 in reflection region 232 and partitions 231 is not established, and thus the uniformity of the luminance cannot be increased.

Support pillar 234 described above may be provided to reduce such effects of bending of luminance uniformizing plate 24. It is to be noted that the shape, quantity, and arrangement of supporting pillar 234 illustrated in FIG. 6 are an example, and is not limited to this. For instance, only one piece of supporting pillar 234, which projects from the center of reflection sheet 23*a* and is inserted in a hole at the center of luminance uniformizing plate 24, may be provided. Alternatively, supporting pillars 234 may be disposed at positions where partitions 231 in a lattice pattern cross each other or at other positions as illustrated in FIG. 6. Also, the hole of luminance uniformizing plate 24, into which the tip of supporting pillar 234 is inserted, is provided in addition to the holes for imparting a predetermined light transmittance distribution pattern to luminance uniformizing plate 24. Such supporting pillar 234 can be produced by injection molding, for instance, a highly reflective material such as polycarbonate. The material may be in common with or different from reflection sheet 23*a*. Also, supporting pillar 234 may be formed integrally with reflection sheet 23*a*, or may be produced separately from reflection sheet 23*a* and attached onto reflection sheet 23*a*.

However, such supporting pillar 234 has an effect on the intensity of light which reaches the first surface of luminance uniformizing plate 24 due to a difference from reflection sheet 23*a* in material or a difference from surrounding partitions 231 in shape. Due to the effect, the light reaching the first surface in the surroundings of supporting pillar 234 may actually be attenuated or amplified. Therefore, the effect causes undesired variation in the intensity of incident light on luminance uniformizing plate 24. Luminance uniformizing plate 24 may have a light transmittance distribution pattern that reduces such undesired variation in the intensity of light caused by supporting pillar 234. For instance, in a region, opposed to the plurality of partitions 231, of luminance uniformizing plate 24 supported by supporting pillar 234, the opening area per unit area and the distance from the vertex portion of each of the partitions may not be positively correlated in the surroundings of supporting pillar 234. Also, in a region, not opposed to the partitions, of luminance uniformizing plate 24, the opening area per unit area and the distance from light source 21 may not have a positive correlation as mentioned above in the vicinity of supporting pillar 234.

Thus, it is possible to reduce undesirable variation in the luminance of emission light of luminance uniformizing plate 24 due to presence of supporting pillar 234 and, uniformity of the luminance is thereby increased.

[1-3. Operation of Liquid Crystal Display Apparatus]

The operation of liquid crystal display 10 configured in the above manner will be described in the following.

Each of light sources 21 turns on and off independently under control. When light source 21 is turned on, the light emitted from light source 21 is incident on luminance uniformizing plate 24 as direct light and as reflection light which is, after being emitted, reflected by reflection sheet 23 or luminance uniformizing plate 24. At this point, ridge-shaped partitions 231 surrounding light source 21 of each reflection region 232 and projecting toward luminance uniformizing plate 24 reduces interference from the light emitted by light source 21 with neighboring reflection regions 232.

Luminosity uniform plate 24 increases the uniformity of the luminance of the incident light and emits the light. The light emitted from luminance uniformizing plate 24 is then incident onto diffusion plate 25. Here, the incident light on luminance uniformizing plate 24 attenuates with travel distance and increase in the number of times the incident light is reflected after being emitted from light source 21, and thereby the intensity varies by location.

In the present disclosure, the light transmittance distribution of luminance uniformizing plate 24 has a negative correlation with the variation in the intensity of the incident light. For instance, the light transmittance per unit area of luminance uniformizing plate 24 is varied with location by providing luminance uniformizing plate 24 with the openings of through holes 241. More specifically, in a region where incident light is relatively weak, large through holes 241 are provided or through holes 241 are provided with a high density so that the opening ratio is relatively increased. This is, for instance, the case with a region which is not opposed to partitions 231 and is away from light source 21. Also, in the region, opposed to partitions 231, of luminance uniformizing plate 24, the degree of attenuation of the reflection light from partitions 231 changes with distance from partitions 231, for instance, and thus variation in the intensity of incident light is caused. Therefore, in the region where the distance from partitions 231 is relatively short, the opening ratio is relatively decreased, and in the region where the distance is relatively long, the opening ratio is relatively increased. Furthermore, in a region which is opposed to light source 21 and receives intense direct light, through hole 241 is not provided. Consequently, the difference in the intensity of incident light with location on luminance uniformizing plate 24 is absorbed, and the uniformity of the luminance of emission light to diffusion plate 25 is increased.

Also, when supporting pillar 234 as illustrated in FIG. 6 is provided, a variation in the intensity of incident light on luminance uniformizing plate 24 occurs due to the light reflection characteristics of supporting pillar 234. The variation in the intensity of light is also absorbed by the variation in the light transmittance per unit area of luminance uniformizing plate 24 in a region affected by supporting pillar 234, for instance, the surroundings of supporting pillar 234. Consequently, the uniformity of the emission light of luminance uniformizing plate 24 is increased.

Diffusion plate 25 diffuses the light having luminance with uniformity thus increased, thereby further increasing the uniformity and emitting the light. The light emitted from diffusion plate 25 is further diffused and concentrated by optical unit 26, and liquid crystal panel 11 is irradiated with the light.

[1-4. Advantageous Effects]

As described above, a backlight device according to the present disclosure includes: a reflection sheet having a reflection surface which is divided into reflection regions by a plurality of partitions that are each a ridge-shaped projection; light sources disposed in the respective reflection regions of the reflection surface; a luminance uniformizing plate that transmits light emitted by the light sources, by receiving the light with a first surface of the luminance uniformizing plate and light reflected off from the reflection sheet and emitting the received light from a second surface of the luminance uniformizing plate, the first surface being located opposite the reflection surface, the second surface being located on a reverse side of the first surface; and a diffusion plate that diffuses and emits the light emitted from the second surface. The luminance uniformizing plate includes a high light-transmittance region between a region opposed to each of the light sources and a region opposed to a vertex portion of a corresponding one of the plurality of partitions, the high light-transmittance region being higher in light-transmittance per unit area than the region opposed to the light source and the region opposed to the vertex portion.

Thus, luminance uniformizing plate 24 has a light transmittance distribution which has a negative correlation with the intensity of incident light that varies with location, and emits light with luminance of increased uniformity.

Also, the luminance uniformizing plate may have a plurality of through holes that penetrate through the luminance uniformizing plate between the first surface and the second surface, and an opening area of the plurality of through holes per the unit area of the luminance uniformizing plate and the light transmittance may have a positive correlation. In a region including an opening has a higher light transmittance. Also, the light transmittance in the region including an opening can be varied by changing the opening area per unit area. Thus, the light transmittance distribution as mentioned above can be imparted to luminance uniformizing plate 24, and therefore the uniformity of the luminance of the light emitted from luminance uniformizing plate 24 to diffusion plate 25 is increased.

Also, in at least part of a region, opposed to the plurality of partitions, of the luminance uniformizing plate, the opening area per the unit area and distance from the vertex portion of each of the plurality of partitions may have a positive correlation. In this configuration, the light transmittance of luminance uniformizing plate 24 is lower in a region which receives reflection light with lower attenuation due to travel distance from reflection sheet 23, and higher in a region which receives reflection light with higher attenuation due to travel distance from reflection sheet 23. Consequently, the uniformity of the luminance of the light emitted from luminance uniformizing plate 24 to diffusion plate 25 is increased.

Also, in at least part of a region, not opposed to the plurality of partitions, of the luminance uniformizing plate, the opening area per the unit area and distance from the respective light sources may have a positive correlation. In this configuration, the light transmittance of luminance uniformizing plate 24 is lower in a region which receives direct light with lower attenuation due to travel distance from light source 21, and higher in a region which receives direct light with higher attenuation due to travel distance from light source 21, the light transmittance of luminance uniformizing plate 24 can be increased. Consequently, the uniformity of the luminance of the light emitted from luminance uniformizing plate 24 to diffusion plate 25 is increased.

Also, the light transmittance in a region, opposed to each of the reflection regions, of the luminance uniformizing plate may take a minimum value in a region opposed to a corresponding one of the light sources, and may take a maximum value between a region opposed to a corresponding one of the light sources and a vertex portion of a corresponding one of the plurality of partitions. In short, the light transmittance of luminance uniformizing plate 24 is lowest in a region which receives the most intense light in the region opposed to reflection region 232. Also, the light transmittance of luminance uniformizing plate 24 is highest in a region which receives direct light more attenuated than the most intense light received by the above-mentioned region and reflection light with relatively large attenuation after being reflected off from reflection sheet 23. Consequently, the uniformity of the luminance of the light emitted from luminance uniformizing plate 24 to diffusion plate 25 is increased.

Also, the reflection sheet further has a supporting pillar that projects to the luminance uniformizing plate above the plurality of partitions and supports the luminance uniformizing plate, and in a surrounding of the supporting pillar in the region opposed to the plurality of partitions, the opening area per the unit area and the distance from the vertex portion of each of the plurality of partitions are not positively correlated. Consequently, undesirable variation in the intensity of light caused by supporting pillar 234 that supports luminance uniformizing plate 24 is eliminated, and therefore the uniformity of the luminance of the light emitted from luminance uniformizing plate 24 to diffusion plate 25 is increased.

Also, a liquid crystal display according to the present disclosure includes: a liquid crystal panel; and one of the above-described backlight devices, which is disposed on a back side of the liquid crystal panel and has a size corresponding to the liquid crystal panel. Consequently there is provided a liquid crystal display that displays a high contrast on the entire screen by area control, and the uniformity of luminance in the area of unit of luminance control is high.

(Other Embodiments)

In the present disclosure, as an exemplary implementation of the present invention, the embodiment and the modification have been described as shown above. However, the present invention is not limited to these, and is applicable to an embodiment in which change, substitution, addition, or omission is made as needed. Also, a new embodiment may be implemented by combining the components described in the embodiment and the modification.

It is to be noted that the shape, size of the components and a ratio of sizes between the components in the present disclosure are an example, and are not limited to this. For instance, the inclined surfaces of partitions 231 may be gentler or steeper. Alternatively, the steepness of the inclined surfaces of partitions 231 may vary with location in reflection region 232. For instance, the inclined surfaces of partitions 231 may be gentle in four corners of reflection region 232 in a plan view, and the inclined surfaces may extend closer to light source 21 than as illustrated in FIG. 2 and FIG. 3. Also in this case, the opening ratio of luminance uniformizing plate 24 and the correlation with the distance from the vertex portion of partition 231 or light source 21 are as described above.

Also, a method of producing each component is not limited to what has been described in the embodiment. For instance, luminance uniformizing plate 24 can be produced by injection molding the resin which is the material. Also, in the method of producing each component, applicable various types of processing methods may be used as necessary. For instance, through holes 241 of luminance uniformizing plate 24 may be provided by punching in press working, or provided by hole-making processing with a drill or a laser.

The present disclosure is generally applicable to a backlight device, and a liquid crystal display apparatus including the backlight device.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The invention claimed is:

1. A backlight device comprising:
a reflection sheet having a reflection surface which is divided into reflection regions by a plurality of partitions that are each a ridge-shaped projection;
light sources disposed in the respective reflection regions of the reflection surface;
a luminance uniformizing plate that is made of a material having translucency and transmits light emitted by the light sources, by receiving the light with a first surface of the luminance uniformizing plate and light reflected off from the reflection sheet and emitting the received light from a second surface of the luminance uniformizing plate, the first surface being located opposite the reflection surface, the second surface being located on a reverse side of the first surface; and
a diffusion plate that diffuses and emits the light emitted from the second surface,
wherein the luminance uniformizing plate includes a first light-transmittance region opposed to each of the light sources, a second light-transmittance region opposed to a vertex portion of a corresponding one of the plurality of partitions, and a high light-transmittance region arranged between the first light-transmittance region and the second light-transmittance region, the high light-transmittance region being higher in light-transmittance per unit area than the first light-transmittance region and the second light-transmittance region.

2. The backlight device according to claim 1,
wherein the luminance uniformizing plate has a plurality of through holes that penetrate through the luminance uniformizing plate between the first surface and the second surface, and
an opening area of the plurality of through holes per the unit area of the luminance uniformizing plate and the light transmittance have a positive correlation.

3. The backlight device according to claim 2,
wherein in at least part of a region, opposed to the plurality of partitions, of the luminance uniformizing plate,
the opening area per the unit area and distance from the vertex portion of each of the plurality of partitions have a positive correlation.

4. The backlight device according to claim 3,
wherein the reflection sheet further includes a supporting pillar that projects to the luminance uniformizing plate above the plurality of partitions and supports the luminance uniformizing plate, and
in a surrounding of the supporting pillar in the region opposed to the plurality of partitions,
the opening area per the unit area and the distance from the vertex portion of each of the plurality of partitions are not positively correlated.

5. The backlight device according to claim 2,
wherein in at least part of a region, not opposed to the plurality of partitions, of the luminance uniformizing plate,
the opening area per the unit area and distance from the respective light sources have a positive correlation.

6. The backlight device according to claim 2,
wherein the light transmittance in a region, opposed to each of the reflection regions, of the luminance uniformizing plate takes a minimum value in a region opposed to a corresponding one of the light sources, and takes a maximum value between a region opposed to a corresponding one of the light sources and a vertex portion of a corresponding one of the plurality of partitions.

7. A liquid crystal display apparatus comprising:

a liquid crystal panel; and the backlight device according to claim 1, which is disposed on a back side of the liquid crystal panel and has a size corresponding to the liquid crystal panel.

* * * * *